3,503,918
AQUEOUS DISPERSION OF THERMOSETTABLE ACRYLONITRILE COPOLYMERS AND ARTICLES COATED THEREWITH
Stanley Le Sota, Horsham, and Bjorn E. Larsson, Rushland, Pa., assignors to Rohm & Haas Company, Philadelphia, Pa., a corporation of Delaware
No Drawing. Filed Dec. 7, 1965, Ser. No. 512,213
Int. Cl. C08f *29/56*
U.S. Cl. 260—29.7                                                  10 Claims

ABSTRACT OF THE DISCLOSURE

An aqueous thermosettable composition adapted to coat various substrates, especially electric wires, containing dispersed therein, a water-insoluble emulsion copolymer, having an apparent second order transition temperature of about 35° to 55° C., of (1) about 50 to 80% by weight of acrylonitrile, methacrylonitrile, or a mixture thereof, (2) about 2 to 8% by weight of at least one amide selected from N-methylolacrylamide, N-methylolmethacrylamide, N-methoxymethylacrylamide and N-methoxy methylmethacrylamide, (3) 0 to about 3% by weight of a monoethylenically unsaturated carboxylic acid, (4) 3 to 6% by weight of a copolymerizable monomer containing at least two non-conjugated groups of the formula $H_2C{=}C{<}$ and (5) the balance, to make 100%, of at least one ester of acrylic acid or methacrylic acid with a saturated aliphatic alcohol having 1 to 8 carbon atoms.

---

The present invention is concerned with the production of thermosettable acrylonitrile copolymers which are useful as coating and impregating compositions and are capable of depositing coatings which have an unusual combination of properties including high solvent resistance, heat resistance, and abrasion resistance, with toughness and flexibility. The invention is particularly concerned with thermosettable acrylonitrile copolymers adapted to provide coating compositions which have outstanding versatility and amenability in respect to application by various types of equipment or by various methods, especially on metals as in the application of electrical insulating coatings on wires.

Many varieties of prior art coating compositions have been used as insulation on magnet wire to be used in the manufacture of core wound electrical devices such as armatures, electromagnets, relays, coils, and the like. The coatings are generally deposited from a solution of the film-forming components in volatile organic solvents. For example, Nowak et al., United States Patent 2,191,581, discloses the application of solutions of copolymers of an acrylic ester and acrylonitrile with a thermosetting resin such as an alkyd resin or a phenol-aldehyde resin.

The solution type wire coatings have the disadvantage of the presence of volatile organic solvents, which are sometimes noxious, and are costly vehicles. Solvent recovery systems to salvage the volatile solvents allay the cost in part. Another disadvantage is that the viscosity of the coating varies significantly with the amount of dissolved film former and application characteristics necessitate applying the coating at low solids with many coats. For example, six or more coats are often required to deposit a 1-mil film on wire.

Sanderson United States Patent 3,032,521 discloses the application of aqueous dispersions of acrylonitrile-acrylic ester copolymers containing a small proportion of an acid component in the coplymer. This type of composition is not thermosettable and depends for its insolubility entirely upon the content of acrylonitrile within the copolymer deposited in the coating.

Sanders United States Patent 2,787,603 discloses the application of an aqueous dispersion containing an acid copolymer of the same type as that described in 3,032,521 and a thermosetting resin, especially a phenol-formaldehyde resin. While this type of composition has thermosetting properties, the composition is frequently beset by difficulties with compatibility. The composition is in general, rather slow in curing so that machine-coating equipment is limited as to the speed of production unless the curing ovens are considerably enlarged to provide adequate curing time at higher speeds. In addition, these compositions are not adaptable to the coating of fine wires which is generally effected by the use of a horizontal trough followed by a die. In this type of equipment, these compositions provide severe gumming up of the die orifice.

Sanders United States Patent 2,787,561 modifies the acid copolymers of 3,032,521 supra by including therein monomer units containing glycidyl groups which are adapted to render the polymer thermosetting on heating. However, this type of composition has several disadvantages including lack of stability and inadequate speed of cure.

The instability of these several acid polymers is recognized in Sanders United States Patent 2,866,763. In addition, this patent recognizes the need for special packaging to prevent contamination of the coating compositions by corrosion that would be formed if they were to be stored in metal containers without special protective lining coatings on the metal.

Logemann et al. United States Patent 3,112,223 discloses the application of linear acrylonitrile/acrylic ester/unsaturated amide copolymers in conjunction with external cross-linkers, such as melamine/formaldehyde condensates for the insulation of electroconductive wires.

In general, suitable compositions for coating of magnet wire, in addition to having the necessary electrical properties, must be flexible, tough, hard, abrasion resistant, resistant to heat shock and heat ageing, solvent resistant, and must be applicable at conventional coating speeds, such as 10 to 40 feet per minute, without the need for abnormal baking temperatures. Resistance to fluorinated organic compounds is particularly important for the coatings of the armature or field winding wire in magnetic motors used in refrigerators wherein they are exposed to the refrigerant liquid, such as Freon.

In accordance with the present invention, thermosettable acrylonitrile copolymers have been found which provide outstanding improvements in the art of coating, and especially in the coating of wires, being far more versatile in regard to methods and equipment by which the composition may be applied, which have improved stability and storability characteristics, and which provide coatings or impregnations of outstanding character on substrates of all types, and especially on wires of both large and fine diameters. The basis of the compositions of the present invention is founded on a water-insoluble copolymer, having an apparent second order transition temperature ($T_i$) between about 35 and 55° C., preferably between 40 and 50° C., of 50 to 80% by weight of acrylonitrile or methacrylonitrile, about 2 to 8% by weight of at least one amide selected from acrylamide, methacrylamide, N-methylolacrylamide, N-methylolmethacrylamide, N-methoxymethylacrylamide, and N-methoxymethylmethacrylamide, the copolymer containing at least 2% by weight of N - methylolacrylamide, N - methoylolmethacrylamide, N-methoxymethacrylamide or N-methoxymethylmethacrylamide, or of a mixture thereof, about 3 to 6%, preferably 4 to 4.5%, by weight of a polyethylenically unsaturated compound, and the balance of the copolymer being constituted of at least one ester of acrylic acid or methacrylic acid with a saturated aliphatic (including alicyclic) alcohol having from 1 to 8 carbon atoms.

Optionally, the copolymer may contain a small amount of about ¼ up to about 3% acid such as acrylic acid, methacrylic acid, or itaconic acid. However, preferred compositions do not contain the acid.

The copolymers are generally of high molecular weight typical of emulsion polymerization which is the method employed for making them. The entire amide component may be methylolated or methoxymethylated. However, it is not necessary to have all of the amide component in this form as long as the copolymer contains at least 2% by weight of such an amide, preferably N-methylolacrylamide or N-methylol-methacrylamide. The copolymers may be prepared from mixtures of the monomers in the proportions stated. The entire content of the amide component of the initial monomer mixture may be simply acrylamide or methacrylamide in which event the copolymer produced is reacted with aqueous formaldehyde or with an aqueous methanolic solution of formaldehyde to introduce methylol and/or methoxymethyl groups.

Not only is the amide component essential, but it has been found that the copolymer must contain, copolymerized therein, about 3 to 6% by weight of a polyethylenically unsaturated monomer, especially one containing two non-conjugated groups of the formula $H_2C=C<$, which serves to internally cross-link the copolymer. Without this component, it has been found that the acrylonitrile/acrylic ester/acrylic amide copolymers exhibit insufficient resistance to flow at elevated temperatures of the order of about 255° C. and up for use as insulating coatings of electric wires. Preferred examples of such monomers include the following diethylenically unsaturated monomers: 1,3-butylene glycol diacrylate, 1,4-butylene glycol diacrylate, ethylene glycol diacrylate, 1,3-butylene glycol dimethacrylate, and N,N'-methylene-bis-acrylamide. Besides, or instead of, these monomers, there may be used as partial or total replacements of any of those just mentioned, the trimethacrylate or triacrylate of glycerol and any of the monomers listed in lines 28–44 of column 2 of United States Patent 2,868,738. These monomers of the patent are incorporated herein by reference.

Another essential component of the copolymer is constituted of the acrylate ester. Examples include methyl acrylate or methacrylate, ethyl acrylate or methacrylate, butyl acrylate or methacrylate, cyclohexyl acrylate or methacrylate, 2-ethylbutyl acrylate or methacrylate, and 2-ethylhexyl acrylate or methacrylate, and n-octyl acrylate or methacrylate.

In any particular copolymer, the content of acrylonitrile may be limited to a proportion below the 80% upper limit of the range specified in order to assure that the $T_1$ value does not exceed 55° C. For example, if the ester employed with the acrylonitrile is methyl methacrylate which tends to form hard polymers, the proportion of acrylonitrile may be reduced to fall in the lower part of the range specified. However, since the methyl methacrylate may be used in conjunction with long-chain alkyl acrylates or methacrylates, which would compensate for the hardness contributed by the methyl methacrylate, the acrylonitrile content may be correspondingly higher.

Preferred copolymers are water-insoluble emulsion copolymers formed entirely of neutral monomers consisting of about 55 to 75% by weight of acrylonitrile, at least one acrylic acid ester of an alkanol having from 1 to 4 carbon atoms, about 4 to 5% by weight of a diacrylate or dimethacrylate of a glycol having 2 to 4 carbon atoms, and about 3 to 6% by weight of amide component as defined hereinbefore.

The copolymers may be prepared by conventional emulsion polymerization procedures, and their specific method of preparation is not part of the present invention. Any of the conventional free radical catalysts used in emulsion polymerization systems, such as the persulfate catalysts, may be employed and redox systems are applicable. The usual non-ionic or anionic emulsifiers (or mixtures thereof) may be used. In general, the proportion of emulsifier may be about 0.5% more or less, based on the weight of monomers. The alkali metal salts of long-chain aliphatic alcohol sulfates such as sodium lauryl sulfate may be used. A typical non-ionic emulsifier such as an alkylphenoxypolyethoxyethanol having an alkyl group of 7 to 12 carbon atoms and from about 8 to 50 ethylene oxide units may be employed.

At the conclusion of polymerization, the aqueous dispersion of the water-insoluble polymer is generally neutral to acidic and it has a solids concentration of about 25 to 60% by weight. It is frequently desirable to render the dispersion alkaline, such as by adding ammonium hydroxide or a volatile amine, such as triethyl amine, to a pH of about 8.5 to 10.

In one preferred embodiment, the aqueous dispersion of the water-insoluble amide-containing copolymer is modified by the addition thereto of a polymeric acid adapted to serve as a thickener when neutralized with an amine or ammonia. Typical materials of this type include polyacrylic acid, polymethacrylic acid, copolymers of acrylic acid, methacrylic acid, itaconic acid, or maleic acid with styrene, vinyltoluene, diisobutylene, or esters of acrylic acid or methacrylic acid with an alkanol having from 1 to 4 carbon atoms in which the acid content of such copolymers may be anywhere from 20% to 95%. These acid thickeners may have a wide range of molecular weight from about 20,000 up to several million. The higher molecular weight types of thickeners may be prepared by copolymerizing 20 to 90% of one of the acids mentioned with the balance of an acrylic ester or other non-acid monomer by emulsion polymerization. In addition, molecular weight may be increased by the inclusion of a very low proportion such as from 0.2 to 0.5% of a polyethylenically unsaturated monomer, such as ethyleneglycol dimethacrylate or divinylbenzene. The proportion of the polymeric acid thickener that may be included in the aqueous dispersion of the water-insoluble amide polymer may be from about 0.5 to 4% based on the weight of the amide polymer in the dispersion. The aqueous dispersion of the amide polymer and the acid thickener may be adjusted to any viscosity by neutralization with ammonia or a volatile amine. Generally a pH of at least 8.5 and preferably in the range of 8.5 to 10 is obtained after the neutralization has been effected.

The aqueous dispersions of the amide polymer, whether or not they contain the polymeric acid thickener are generally diluted to concentrations of 5 to 20%, and preferably in the range of about 10 to 15% to adapt the compositions to coating or impregnating operation. The particular concentration selected will, of course, depend upon the particular method and/or equipment employed in the coating operation and is also chosen to provide the desired thickness of coating.

Any suitable coating or impregnating method or equipment may be employed. For example, in the coating of wires, a system in which the wire is passed about a roll in the coating bath and then traversed vertically upwardly to and through a drying and curing oven may be employed. On the other hand, the application to wire may involve a generally horizontal travel of the wire through a trough containing the coating composition and then through a die to control the thickness of the deposit followed by passage through a heated oven. The coating may be applied by brushing, roll transfer, electrophoresis, dipping or in any other suitable fashion.

After coating and/or impregnating, the treated substrate may be dried in a suitable fashion such as by drying in ambient air or by application of hot air, infrared, or by radio frequency dielectric currents. Concurrently with or following the drying, the coating is cured or baked by being subjected to a temperature in the range of 110° to 400° C. or higher for a period of time varying from a few seconds at the higher temperature to several minutes at the lower temperature. It is one of the advantages of the present invention that the speed of curing of the polymers is quite rapid so that high speeds may be employed in wire coating equipment having curing ovens or other equipment of conventional length.

The composition of the present invention may be employed to provide either a primer composition or a finish composition or both on all sorts of metals including automobile bodies. While the copolymers of the present invention are particularly useful in the coating of metal wires, such as of copper and aluminum, because of their outstanding resistances to solvents, heat, and abrasion, they are, of course, quite useful also in the formulation of coating compositions for numerous other uses such as e.g., outside house paints, architectural paints, masonry paints, factory applied coatings for galvanized steel and other metals, coatings inside and outside of cans or tins, e.g. those used in food-packing industries, to provide protection against corrosion, finishing coats for refrigerators, washing machines, kitchen cabinets, etc. They may also be used in coating flexible substrates, such as, e.g. leather, paper, textile fabrics, including those made from cotton, rayon, nylon, glass, polyacrylonitrile and polyethylene terephthalate.

The coating compositions of this invention may be further modified by the addition of plasticizers, stabilizers, pigments, extenders, coalescents, and other film formers. In general, however, the need for a coalescent, such as tetramethylene sulfone, is absent. The particular compositions of the present invention having a pH of 8.5 to 10 or more when applied at room temperature and partially dried at room temperature deposits the polymer as very fine tightly coherent particles which, however, fuse together to a uniform film on heating the partially dried, still wet deposit to the temperature normally employed in baking as specified hereinabove.

Ionizable content in the compositions may be removed, if desired, by dialysis, precipitation, or deionization with ion-exchange resins.

The surface tension of the coating composition at the time of application is preferably adjusted, if adjustment is necessary, to provide that the composition as applied has a surface tension of about 35 to 60 dynes per centimeter at 25° C., 13% to 18% solids, and a pH of 9 to 10. Surface tension of the latex can be increased by deionization, or decreased by the addition of emulsifier. Preferred compositions for application by a vertical wire coating system have a surface tension of about 45 to 50 dynes per centimeter. Similarly, in this type of coating operation the viscosity composition at 13% solids and room temperature should be about 22 to 32 centipoises as determined on a Brookfield Viscometer at a speed of 60 r.p.m. using Spindle No. 2.

The coating compositions of the present invention have good wetting properties and provide coatings having excellent adhesion and flexibility in combination with excellent resistances to solvents, heat, and abrasion. They are applicable over a wide range of coating speeds in a wide variety of coating equipment and have the unusual capability of coating extremely fine gauge wires which have generally never been successfully coated by aqueous systems heretofore.

The compositions may include a metal drier such as zinc octoate or zinc naphthenate, particularly if the polymer contains a small amount of acid, the amount being from 0.01 to 0.2% based on the weight of the water-insoluble amide-containing copolymer. Optionally, the compositions may be modified by the inclusion of a phenoplast or an aminoplast in small proportions. However, such additional thermosetting materials are unnecessary to provide the outstanding properties obtainable by the compositions of the present invention and it is one of the advantages of the copolymers of the present invention that they can provide outstanding thermoset coatings without additional thermosetting coating materials.

In the following examples which are illustrative of the present invention, the parts and percentages are by weight unless otherwise indicated.

PREPARATION OF COPOLYMERS (1) An emulsion copolymer is prepared as described hereinafter using the following:

First charge

Monomers:
 Butyl acrylate—840 g.
 Acrylonitrile—1728 g.
 N-methylolacrylamide—67 g.
 Acrylamide—47.5 g.
 1,3-butane diol dimethacrylate—114.5 g.
Dispersing agent:
 Sodium lauryl sulfate—17.1 g.
Polymerization initiator, etc.:
 Ammonium persulfate (10% solution)—42 ml.
 Sodium hydrosulfite (10% solution)—42 ml.
 $FeSO_4$ (0.15% solution)—100 ml.
 Water—10,500 ml.

Second charge

Same amount of monomers above
Ammonium persulfate (0.5% solution)—680 ml.
Sodium hydrosulfite (0.5% solution)—680 ml.

Polymerization occurs in the first charge about 15 to 30 minutes, then the system is cooled to about 30° C. and the second charge is made. After about 45 minutes to an hour, the product is cooled. If desired, a small amount of additional initiator may be added at the end to polymerize any residual monomer.

(2) Same as (1) except 1,4-butane diol diacrylate replaces the fourth monomer listed.

(3) Same as (2) except butyl acrylate is replaced by methyl acrylate.

(4) Same as (2) except butyl acrylate is replaced by ethyl acrylate.

(5) Same as (1) except butyl acrylate is replaced by 2-ethylhexyl acrylate and 1%, based on the weight of monomers, of methacrylic acid is included.

(6) Same as (1) except that methacrylonitrile replaces the acrylonitrile and tetraethylene glycol diacrylate replaces the diacrylate there used.

(7) Same as (1) except that ethylene glycol diacrylate is used for the diacrylate.

(8) Same as (1) except methylene-bis-acrylamide replaces the diacrylate.

(9) Same as (1) except the following monomers are used in the proportions indicated:

| | Percent |
|---|---|
| Butyl acrylate | 29 |
| 1,4-butane-diol diacrylate | 3 |
| Acrylonitrile | 65.5 |
| N-methoxymethyl-acrylamide | 2.5 |

(10) Same as (1) except methacrylamide replaces acrylamide and N-methylolmethacrylamide replaces N-methylolacrylamide.

(11) Same as (1) except the following monomers are used in the proportions indicated:

| | Percent |
|---|---|
| Acrylonitrile | 50 |
| Methyl acrylate | 26 |
| Methyl methacrylate | 10 |
| Methylene-bis-acrylamide | 6 |
| N-methylolacrylamide | 8 |

(12) Same as (1) except the following monomers are used in the proportions indicated:

| | Percent |
|---|---|
| Acrylonitrile | 80 |
| 2-ethylhexyl acrylate | 15 |
| N-methylolmethacrylamide | 2 |
| 1,4-butane-diol dimethacrylate | 3 |

All of these dispersions in (1) through (12) are applicable for coating substrates of all sorts, such as wood, metals, masonry and the like. Preferably, they are applied to the substrates needing protection while in portable condition so that they can be passed through heated ovens for curing to heat-resistant and solvent-resistant condition. They may be applied as a clear or a pigmented composition. Rheology controlling agents, especially thickeners of polymeric character, may be included in small amounts. The compositions may optionally include other film-forming materials, such as other thermoplastic water-insoluble addition polymers made by emulsion polymerization techniques, examples being polyvinyl chloride, copolymers of vinyl chloride or vinylidene chloride with acrylonitrile and/or esters of acrylic acid or methacrylic acid, copolymers of vinyl chloride with vinyl acetate, polyvinyl acetate, polymers of esters of acrylic acid or methacrylic acid with small amounts of one or both of these acids or with itaconic acid, and copolymers of ethyl acrylate with styrene, vinyltoluene or methyl methacrylate. The coating compositions may also include phenol-aldehyde condensates, especially phenol-formaldehydes, or aminoplasts, such as condensates of formaldehyde with urea, melamine, ethylene urea, and the like. They may also include alkyd resins or poly-vic-epoxide resins.

In the coating of copper or aluminum wires to provide electrical insulation thereof which is a preferred embodiment of the invention, the composition is generally applied at a total solids content in the range of about 11 to 16%, a pH of about 8.5 to 10, a surface tension of 44 to 50 dynes per centimeter, and a viscosity of 20 to 32 centipoises (Brookfield, spindle No. 2, 60 r.p.m.).

While any of the compositions of (1) through (12) provide good wire coatings, the following description is typical and uses the polymer dispersion of (1) above.

(13) An aqueous wire "enamel" is prepared by mixing the 30%-solids dispersion of (1) after deionization thereof with a 30% aqueous solution of polyacrylic acid and a 30% aqueous dispersion of a copolymer of about 60% ethyl acrylate and 40% methacrylic acid in the proportions of 100:1.5:1.5 by weight. Then 100 parts of distilled water is added to 100 parts of the mixture obtained to provide a solids concentration of about 14%. A small amount (about 0.5 part) of 28% ammonium hydroxide is added to adjust the pH to 9. The resulting composition has a viscosity of 22 centipoises and a surface tension of 45.5 dynes per centimeter both measured at 25° C.

This coating bath is disposed in a trough of a commercial wire coating installation having a vertical curing chamber of about 30-foot height disposed above the trough. Grooved driven, or guide, rolls are disposed on horizontal axes above each other, one partially immersed in the coating bath and one in the upper end of the heating chamber. The wire is led to one groove of the bottom roll which passes the wire through the bath after which the wire proceeds upwardly through the heating chamber to a groove in the roll at the top thereof and then back down to the next groove in the bottom roll. By looping the wire about several grooves of the two rolls, it may be provided with repeated coatings and intervening curing of each. Generally 3 to 6 coatings are thus applied. The curing chamber may have a constant temperature throughout but in the particular embodiment herein described, the chamber has four sections of approximately equal length in which the temperatures are about 350° F., 640° F., 710° F., and 720° F. from bottom to top.

In this equipment, eighteen gauge magnet wire is continuously passed through the bath and the curing oven three times at a speed of 29 feet per minute. On testing, it had a cut-through temperature of 240° C. which is well above the minimum (200° C.) accepted in the industry. Its scrape abrasion resistance is 48 strokes, well above the minimum acceptable. The coating shows good adherence and passes the "sudden stretching to break" test. It is solderable as determined by immersing the coated wire in solder at 800° F. and finding that the solder destroys the coating and adheres to the wire. The coating resists removal by boiling in 70 alcohol/30 toluene for 1 hour. It also passes the "heat shock" test. The tests mentioned herein are described in 2,787,561 and the description thereof in that patent is incorporated herein by reference.

We claim:
1. An aqueous dispersion of a crosslinked copolymer, having an apparent second order transition temperature of about 35° to 55° C., of (1) about 50 to 80% by weight of acrylonitrile, methacrylonitrile, or a mixture thereof, (2) about 2 to 8% by weight of at least one amide selected from N-methylolacrylamide, N-methylolmethacrylamide, N - methoxymethylacrylamide and N-methoxymethylmethacrylamide, (3) 0 to about 3% by weight of a monoethylenically unsaturated carboxylic acid, (4) 3 to 6% by weight of a copolymerizable monomer containing at least two non-conjugated groups of the formula $H_2C=C<$ and (5) the balance, to make 100%, of at least one ester of acrylic acid or methacrylic acid with a saturated aliphatic alcohol having 1 to 8 carbon atoms.

2. An aqueous dispersion as defined in claim 1 which also comprises a water-soluble polymeric carboxylic acid thickener and is adjusted with ammonium hydroxide to a pH of at least 8.5.

3. A composition of matter consisting essentially of an aqueous dispersion of a copolymer as defined in claim 1, and a water-soluble ammonium salt of a polymer containing at least 20% by weight of acrylic acid, methacrylic acid, or of a mixture of said acids and ammonia to give a pH of at least 8.5.

4. An aqueous dispersion according to claim 1 in which the monomer (1) is acrylonitrile.

5. As an article of manufacture, a solid substrate carrying on at least one surface thereof a cured, heat-resistant and solvent-resistant deposit of a composition as defined in claim 1.

6. As an article of manufacture, a solid substrate carrying on at least one surface thereof a cured, heat-resistant and solvent-resistant deposit of a composition as defined in claim 2.

7. As an article of manufacture, a solid substrate carrying on at least one surface thereof a cured, heat-resistant and solvent-resistant deposit of a composition as defined in claim 4.

8. An article as defined in claim 4 in which the solid substrate is a metal.

9. As an article of manufacture, a metal wire having its surface covered with a coating adhered thereto of a cured, heat-resistant and solvent-resistant deposit of a composition as defined in claim 1.

10. A method of protecting a solid substrate with an electrical insulating coating which comprises applying to the surface to be protected an aqueous composition as defined in claim 1, and subsequently drying and heating the coated item to at least a temperature of 110° C. to 400° C. and for a period of at least several seconds, the heating being sufficient to render the coating heat-resistant and solvent resistant.

References Cited

UNITED STATES PATENTS

| | | |
|---|---|---|
| 3,366,584 | 1/1968 | Zimmerman. |
| 3,037,952 | 6/1962 | Jordan et al. |
| 3,104,231 | 9/1963 | Fitch. |
| 3,112,223 | 11/1963 | Logemann et al. |

MURRAY TILLMAN, Primary Examiner

H. ROBERTS, Assistant Examiner

U.S. Cl. X.R.

117—161, 232; 260—29.4, 29.6, 80.73